United States Patent
Branton

(10) Patent No.: US 10,972,349 B1
(45) Date of Patent: Apr. 6, 2021

(54) CRYPTOGRAPHIC VERIFICATION OF DATA INPUTS FOR EXECUTABLES ON A NETWORK

(71) Applicant: Matthew Branton, New York, NY (US)

(72) Inventor: Matthew Branton, New York, NY (US)

(*) Notice: Subject to any disclaimer, the term of this patent is extended or adjusted under 35 U.S.C. 154(b) by 0 days.

(21) Appl. No.: 16/993,137

(22) Filed: Aug. 13, 2020

(51) Int. Cl.
*H04L 29/06* (2006.01)
*H04L 12/24* (2006.01)
*H04L 9/32* (2006.01)

(52) U.S. Cl.
CPC .......... *H04L 41/082* (2013.01); *H04L 9/3247* (2013.01); *H04L 63/126* (2013.01)

(58) Field of Classification Search
CPC ... H04L 41/082; H04L 9/3247; H04L 63/126; H04L 12/24; H04L 9/32; H04L 29/06
USPC ......................................................... 713/170
See application file for complete search history.

(56) References Cited

U.S. PATENT DOCUMENTS

| | | | | |
|---|---|---|---|---|
| 8,692,826 B2* | 4/2014 | Beckman | ................ | G06F 9/451 345/420 |
| 2013/0144834 A1* | 6/2013 | Lloyd | ................... | G06F 16/951 707/617 |
| 2014/0310619 A1* | 10/2014 | Fickenwirth | ............ | G06F 3/048 715/762 |
| 2017/0220610 A1* | 8/2017 | Laethem | ............. | G06F 11/3006 |

* cited by examiner

*Primary Examiner* — Evans Desrosiers
(74) *Attorney, Agent, or Firm* — Pillsbury Winthrop Shaw Pittman LLP

(57) ABSTRACT

In some embodiments, a message and a digital signature related to the message may be obtained, where the message may include a source identifier of a data source and values associated with parameters for an executable. The message may be transformed into a network-specific data structure having a specific format associated with a network. A verification of the network-specific data structure may be performed based on the digital signature. The values may be provided to the executable based on the verification indicating a match between the network-specific data structure and the digital signature.

20 Claims, 7 Drawing Sheets

Blockchain 200

⋮

Block 202

[Transaction information 222a and/or cryptographic version thereof]
[Transaction information 222b and/or cryptographic version thereof]
...
[Transaction information 222n and/or cryptographic version thereof]

⋮

Block 204

[Transaction information 224a and/or cryptographic version thereof]
[Transaction information 224b and/or cryptographic version thereof]
...
[Transaction information 224n and/or cryptographic version thereof]

⋮

Block 206

[Transaction information 226a and/or cryptographic version thereof]
[Transaction information 226b and/or cryptographic version thereof]
...
[Transaction information 226n and/or cryptographic version thereof]

CRYPTOGRAPHIC VERIFICATION OF DATA INPUTS FOR EXECUTABLES ON A NETWORK

FIELD

The present application generally relates to cryptographic data verification, such as, for example, cryptographic verification of one or more data inputs for an executable capable of initiating an update to a decentralized network.

BACKGROUND

Computer programs include code that, when executed, cause a computing device to perform one or more actions. The computer programs may start manually or automatically. An example of starting a computer program manually may be invoking a command (e.g., a pressing a button, clicking a mouse, tapping a touch screen, etc.). Automatically executed computer programs require certain conditions to be met. For example, a computer program may be automatically invoked when a sensor detects a particular input signal (e.g., a light is turned on when a motion sensor detects movement). However, for many computer programs, verifying the authenticity of the inputs that cause the condition to be met, can be difficult. Verification of input parameters may compound in difficulty if a source of the inputs is unable to be verified as having generated the inputs. There is a need for verifying that the inputs used to execute a computer program are accurate and were generated by a source that the computer program expected the inputs to have been generated by.

SUMMARY

Aspects of the present application relate to methods, apparatuses, and/or systems for facilitating cryptographic data verification for update data or other data inputs for an executable on a network.

In some embodiments, a message and digital signature related to the message may be obtained. The message may include a source identifier associated with a data source that the message is indicated as having been originated from, and may also include values associated with parameters of an executable. The message may be transformed into a network-specific data structure having a network-specific format associated with a network, where the network-specific format may represent the values in the network-specific format. A verification of the network-specific data structure may be performed based on the digital signature and the values may be provided to the executable based on the verification indicating a match between the network-specific data structure and the digital signature. The executable may initiate an update to the network based on the values.

BRIEF DESCRIPTION OF THE DRAWINGS

FIG. 2 shows a blockchain including blocks and transactions, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
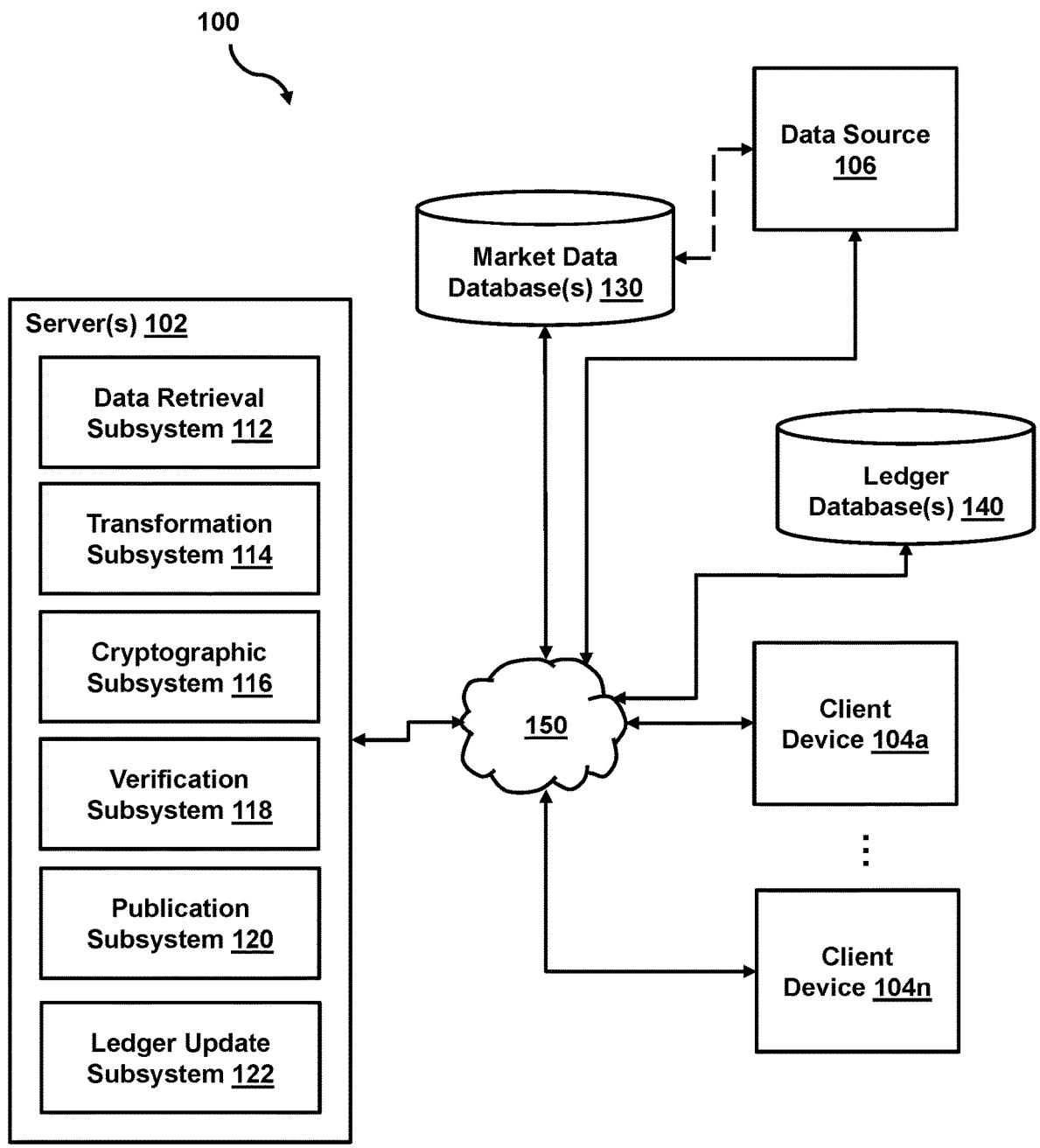
FIG. 1 shows a system for facilitating cryptographic verification of update data, in accordance with one or more embodiments.

FIG. 1 shows a system for facilitating cryptographic verification of update data, in accordance with one or more embodiments. As shown in FIG. 1, system 100 may include server(s) 102, data source 106, client devices 104a-104n (individually and collectively referred to as "client device 104" and "client devices 104," respectively), or other components. Server 102 may include a data retrieval subsystem 112, a transformation subsystem 114, a cryptographic subsystem 116, a verification subsystem 118, a publication subsystem 120, a ledger update subsystem 122, or other components. Data source 106 may include a source of update data, such as a market update. As an example, data source 106 may be an exchange that generates update data. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, client devices 104, and/or data source 106, those operations may, in some embodiments, be performed by other components of server 102, client devices 104, and/or data source 106, or other components of system 100. As an example, while one or more operations are described herein as being performed by components of server 102, those operations may, in some embodiments, be performed by components of client device 104. In one use case, for instance, server 102, client device 104, or data source 106 may each be a network node that comprises subsystems 112-122, or other components. Furthermore, client device 104, data source 106, or client device 104 and data source 106 may each include an instance of subsystems 112-122. For example, data source 106 may include an instance of data retrieval subsystem 112, an instance of transformation subsystem 114, an instance of cryptographic subsystem 116, an instance of verification subsystem 118, an instance of publication subsystem 120, an instance of ledger update subsystem 122, or other components. It should be noted that, although some embodiments herein describe features with respect to Bitcoin or Ethereum, such features may in other embodiments be apply to other digital currencies as well as other blockchain or other ledger technologies.

A smart contract refers to a computer program that is configured to automatically execute upon determining that criteria of the contract have been met. As an example, consider a binary option on the price of a company's stock that expires at the end of a particular day. A smart contract may be created that allows parties to deposit a certain quantity of funds (e.g., dollars, Euros, Bitcoin, etc.) and choose whether the price of the stock will be greater than or less than a strike price. If a party bids correctly on the option, then the smart contract may automatically disperse funds to that part. However, in order for the smart contract to execute, the actual price of the company's stock must be known.

Currently, there are no mechanisms available for mathematically verifying that an update originated from a given data source. For example, given a market update from an exchange, which may be received by a first party and provided to a second party, there are no mechanisms currently available for the first or second party to mathematically verify that the market update originated from the exchange. Therefore, there is no mechanism available to verify this update.

In some embodiments, system 100 may facilitate verification of update data, which may be used by an executable to initiate an update on a decentralized and distributed digital ledger (e.g., a decentralized blockchain or other decentralized ledger). The decentralized and distributed digital ledger may be used to record transactions across many computer systems associated with different entities in such a way that the transactions cannot be altered retroactively without the alteration of all subsequent blocks and the collusion of the network. The use of a blockchain (or other such ledger) removes the characteristic of infinite reproducibility from a digital asset, and confirms that each unit of value was transferred only once, thereby solving the long-standing problem of double spending. As an example of a digital ledger, FIG. 2 shows a blockchain (e.g., blockchain 200) including blocks (e.g., blocks 202, 204, and 206) and transactions (e.g., transaction information 222, transaction information 224, transaction information 226, or cryptographic versions thereof). Each block may hold batches of valid transactions that are hashed and encoded (e.g., into a Merkle tree or other tree). Each block may also include the hash of the immediately-prior block of the blockchain, thereby linking the two blocks. The iterative process to form the chain of blocks confirms the integrity of the previous block, all the way back to the original genesis block. By storing data across its network, the decentralized blockchain eliminates the risks that come with data being held centrally. Specifically, for example, the decentralized blockchain lacks centralized points of vulnerability that can be exploited, as well as a central point of failure that can bring down the entire network. In some embodiments, digital ledger security may include the use of public-key cryptography. In some embodiments, a public key associated with a user may be used as an address on a blockchain or other ledger. Value tokens that are sent across the ledger network may be recorded as belonging to that address (e.g., previously belonging to that address prior to a valid transaction conveying the value tokens to another user, currently belonging to that address as a result of a transaction conveying the value tokens to the user, etc.). A private key (corresponding to the public key) may be used by the user to access to the user's digital assets or otherwise interact with the blockchain (or other ledger).

The private key and the public key form the basis for asymmetric cryptography. Each public key is associated with one private key, and together the public key and the private key may be used to encrypt and decrypt communications. For example, a communication that is encoded using a given user's public key can only be decoded using that user's private key thereby enabling secure transmission of the communication to the user. As another example, a communication that is encoded using a given user's private key may be decoded by using the user's public key. The private key and the public key are mathematically related to one another. Various mathematical algorithms can be used to produce a public key and a private key for a user including, but not limited to (not to imply that other lists are limiting), Rivest-Shamir-Adleman (RSA), Digital Signature Standard (DSS), Diffie-Hellman key exchange protocol, ElGamal, elliptic curve cryptography (e.g., Curve-25519, NIST P-256), Paillier cryptosystems, Cramer-Shoup cryptosystems, YAK, Merkle-Hellman knapsack cryptosystems, or other algorithms.

In some embodiments, system 100 maintains data quality via massive database replication and computational trust across its network nodes, where no centralized "official" copy of the blockchain (or other such digital ledger described herein) exists, and no user is "trusted" more than any other user. In some embodiments, messages reporting transactions are delivered to network nodes on a best effort basis. Upon obtaining such messages, mining nodes validate the transactions, add them to the block that the mining nodes are building, and broadcast the completed block to other nodes. In some embodiments, various time-stamping schemes may be used to serialize changes on the blockchain (or other ledger). The time-stamping schemes may include proof-of-work, proof-of-stake, proof-of-burn, or other schemes.

Blockchain 200, or another digital ledger, may be updated in response to an executable initiating the update. In some embodiments, a smart contract or other executable may initiate an update to a blockchain in response to certain conditions being satisfied. As an example, the condition being satisfied may include a verification, may be performed with respect to parameter values of update data and a reference value, where the reference value may be generated from a digital signature related to the update data and a public key associated with a data source from which the update data was obtained (e.g., data source 106). In some embodiments, the verification may be performed to verify that the update data, indicated as being obtained from a particular data source, did, in fact, originate from that data source. In some embodiments, the executable (e.g., a smart contract) may be stored on a decentralized network, and the blockchain may also be on the decentralized network.

Data source 106 may refer to an entity that generate update data and/or a message including/representing update data. For example, market data may be published by an exchange or via another channel that obtains the market data from the exchange (or from another channel). If a party receives the market data directly from the exchange, and has an established trust with the exchange, then the party can trust that the market data is accurate. However, most parties do not receive market data directly from an exchange, or are able to establish a level of trust with the exchange to confirm the authenticity of the market data. For example, given a market update from a data source (e.g., an exchange), received by a first party, which, in turn, provides the market update to a second party, there are no present mechanism available for the first or second party to mathematically verify that the market update originated from the data source. For this reason, executing settlements via a smart contract using such market data will rely implicitly on unverified data.

In one use case, financial contracts, which may be smart contracts (e.g., digital contracts), require settlement information at a minimum in order to execute the terms of the contracts. The settlement information may be obtained from financial exchanges (e.g., data sources). Trading-related applications typically require market data from one or more data sources. One type of data source is an "oracle." An oracle refers to a data source that is trusted to provide accurate information (e.g., market data). In some embodiments, blockchains and other digital ledgers running on a distributed and decentralized network may be provided with market information from an oracle due to the level of trust associated with the oracle. However, the most accurate market data is received from an exchange directly because that is the data source that generates the market data. Providing this trusted market data to applications that would otherwise use an oracle, such as smart contracts executing financial decisions, it enables a simple and effective mechanism to create trustless instruments.

In some embodiments, update data includes market data (e.g., financial market data). Market data may include a number of parameters. For example, the market data may include a primary instrument, a secondary instrument, a price, a quantity, a side, a timestamp or sequence number, or other parameters. A primary instrument refers to an instrument having characteristics that are not calibrated against any other instrument. A secondary instrument refers to an instrument that have characteristics that are calibrated or determined from other instruments. As an example, a primary instrument may refer to a symbol representing a stock, and the second instrument may refer to a price of that stock in a particular currency, or in relation to another currency. The price may refer to a value of the primary instrument in terms of the secondary instrument (e.g., the price of Company X's stock in dollars). The quantity may refer to a number of units of the primary instrument, which may be whole units, fractions of a unit, or both. The timestamp or sequence number may refer to a point in time that the market data occurred with reference to a time (e.g., a particular clock), relative to other updates in a given session of updates, etc. In some embodiments, additional information, such as decimalization, minimum or maximum quantities, internal identifier to symbol mappings, or other information, may also be included or associated with the update data. In some embodiments, the information regarding the data source itself may be included with the update data, associated with the update data, or derivable from the update data. For example, the update data may include an IP address, URL, MAC address, public key, or other identification information associated with data source 106.

In some embodiments, data retrieval subsystem 112 may obtain a message, which may include first data. For example, data retrieval subsystem 112 may obtain market data related to an update to a financial market, such as a new or updated value of a stock or other instrument at a given time. The message may be obtained from a data source (e.g., data source 106). An example of a data source may be a financial exchange, a party that obtained the message from a data source and subsequently provided the message to server 102, or another entity. The number of parties that relay the message prior to being sent to server 102 may be 1 or more parties, 5 or more parties, 10 or more parties, etc. As a recipient of the message, server 102 relies on a web of trust of the parties for validity of the message and its contents unless server 102 can be guarantee that the source from which the message was received is the generator of the market data.

In some embodiments, the message may include a source identifier associated with data source 106 and values associated with one or more parameters for an executable. The source identifier may represent an identifier of the data source, such as a web address of the data source (e.g., an IP address, MAC address, etc.), a symbolic representation of the data source (e.g., one or more characters representing the source), or other identifiers. The source identifier may be a publicly available representation or may be a privately-used representation, known only to certain authorized entities. The values of the parameters for the executable may represent values capable of being input to the executable for initiating an update to the network. For example, the values may be inputs for a smart contract that can initiate an update to a blockchain. If the values, after being provided to the smart contract, indicate that a new block is to be added to the blockchain, then the smart contract may use the values and aspects of the smart contract to cause a block associated with the update to be added to the blockchain. For example, if the smart contract indicates that a certain amount of funds are to be dispersed to a party based on the smart contract and the values (e.g., Party A is to receive X funds from Party B based on the value of stock Y at time Z), then a block may be added to a blockchain on a decentralized network representing the transaction.

Figure 3A:
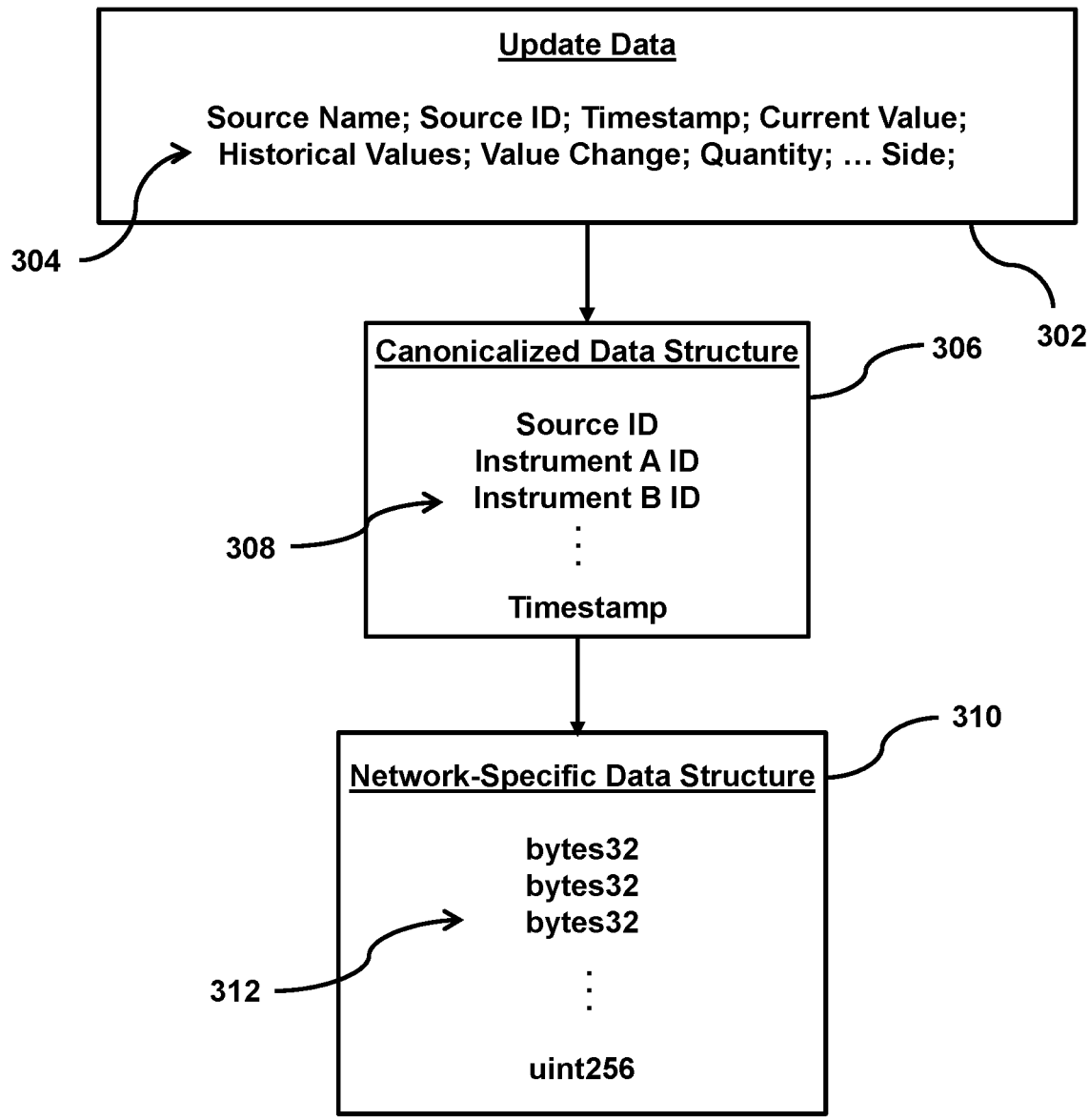
FIGS. 3A and 3B show update data being transformed into a network-specific data structure, and using the network-specific data structure and a public key to perform a verification of the update data, respectively, in accordance with one or more embodiments.

In some embodiments, the message, the updated data included within the message, or both, may be represented in a first format. For example, the update data may include a string of characters (e.g., letters, numbers, punctuations, etc.) including information regarding a primary instrument, a secondary instrument, a price, a quantity, a side, a timestamp or sequence number, or other information. As an example, with reference to FIG. 3A, update data 302 may include parameter values 304 (e.g., Source Name, Source ID, Timestamp, Current Value, Historical Values, Value Change, Quantity, Side, or other parameters values) represented in a first format. In some embodiments, the first format may include representing parameter values 304 as a continuous string of characters with delimiters or other demarcations indicating when one parameter value ends and another begins.

In some embodiments, transformation subsystem 114 may be configured to take the obtained message, the update data included within the obtained message, or both, and transform the message from the first format into a first data structure. For example, with reference to FIG. 3A, update data 302 may be transformed into canonicalized data structure 306 including parameter values 308. The first data structure may be a canonicalized data structure having a canonicalized format that differs from the first format (e.g., the format of the update data originally obtained). Additionally, the canonicalized data structure may represent the values for the executable, included by the update data, in the canonicalized format. The canonicalized format may be a standardized format, which as detailed below, may be used for further processing and verification of the update data. By transforming the update data into the canonicalized format, the values of the parameters for the executable may be conformed from their initial, and possibly different representations included within the update data into a standardized format.

As an example, referring again to FIG. 3A, a canonicalized data structure 306 may include parameter values 308. Parameter values 308 may represent parameter values 304 from update data 302 in a canonicalized format. For example, for single-sided pricing, canonicalized data structure 306 may be represented as:
- Exchange Identifier
- Instrument A Identifier
- Instrument B Identifier
- Price
- Quantity
- Side
- Timestamp (or sequence number)

As another example, canonicalized data structure 306 for two-sided pricing may be represented as:
- Exchange Identifier
- Instrument A Identifier
- Instrument B Identifier
- Ask Price
- Bid Price
- Ask Quantity
- Bid Quantity
- Timestamp (or sequence number)

As seen from both the single-sided pricing data structure and the two-sided pricing data structure, the format of canonicalized data structure 306 (e.g., the canonicalized format) standardizes the information that is included in update data 302. Some embodiments include additional parameters for the single-sided pricing data structure, the two-sided pricing structure included, or both. For example, decimalization, minimum and/or maximum quantities, internal identifier to symbol mapping, and the like, may also be included in either data structure, or may be included in metadata associated with either data structure.

In some embodiments, transformation subsystem 114 may be further configured to transform the canonicalized data structure into a network-specific data structure. As an example, referring again to FIG. 3A, canonicalized data structure 306 may be transformed to network-specific data structure 310 including network-specific parameter values 312 represented using a network-specific format. In some embodiments, network-specific data structure 310 may refer to a data structure having the parameter values formatted in a network-specific format associated with a network that the executable is stored on. For example, if the executable is a smart contract on the Ethereum blockchain, then the network-specific format would refer to a format specific to the programming characteristics of the Ethereum blockchain. In Ethereum, for instance, smart contracts may be written in Solidity, which is a language library specific to the Ethereum blockchain. In some embodiments, the network-specific format is variable for a given network. For example, the network-specific format for the Ethereum blockchain may be variable.

In some embodiments, network-specific data structure 310 including network-specific parameter values 312 represented using a network-specific format, for single-sided pricing, may have the following representation:
- bytes32
- bytes32
- bytes32
- uint256
- uint256
- boolean
- uint256

Similarly, network-specific data structure 310 including network-specific parameter values 312 represented using a network-specific format, for two-sided pricing, may have the following representation:
- bytes32
- bytes32
- bytes32
- uint256
- uint256
- uint256
- uint256
- uint256

The term "bytes32" refers to a 32-byte string of characters used to store data, where the data type, "byte," represents a sequence of bytes. "Bytes" represents a dynamic array of bytes, and in Solidity, variables can be defined using "byte[s]". Various operations may be performed on variables defined in each data structure depending on the task(s) to be performed (e.g., AND, OR, XOR, NEGATION, etc.). In addition, addresses may also be encoded using the bytes array. The term "uint256" refers to another data type in Solidity, a number that is stored in 256 bits of unsigned numbers ranging from 0 to $2^{256}$. The term "boolean" refers to a value type that can be used to represent scenarios with binary outcomes (e.g., TRUE, FALSE). The boolean data type is declared and assigned a value.

Although the aforementioned examples refer to the Ethereum blockchain, other platforms may, alternatively, be used. Other cryptographic currencies that may be used include, but are not limited to (which is not to suggest that any other list is limiting), Bitcoin, Ripple, Litecoin, Tether, Libra, Monero, EOS, NEO, and IOTA.

Network-specific parameter values 312, represented by network-specific data structure 310, may be transformed from a canonicalized format to a corresponding network-specific format. For example, parameter values 308 of canonicalized data structure 306 may include an "Exchange Identifier," "Instrument A Identifier," and "Instrument B Identifier," and may be transformed to the network-specific parameter values 312 represented as an instance of "bytes32" in network-specific data structure 310. Each of the parameter values' "Exchange Identifier," "Instrument A Identifier," and "Instrument B Identifier" may therefore be represented in network-specific data structure 310 by a 32-bit dynamic array (which may or may not include padding). As another example, parameter values 308 of canonicalized data structure 306 may include "Price," "Quantity," and "Timestamp," and may be transformed into a network-specific parameter that values 312 represented as instances of "uint256" in network-specific data structure 310. Each of the parameter values, "Price," "Quantity," and "Timestamp," may therefore be represented in network-specific data structure 310 by a number having 256 bits ranging between 0 and $2^{256}$. As yet another example, parameter values 308 of canonicalized data structure 306 may include "Side," and may be transformed to network-specific parameter values 312 represented as an instance of the variable "boolean". The parameter value "Side" may therefore be represented in network-specific data structure 310 by a value that is declared and assigned in the corresponding executable.

In some embodiments, transformation subsystem 114 may be configured to transform canonicalized data structure 306 into a plurality of network-specific data structures (e.g., multiple instances of network-specific data structure 310), each associated with a different network. For example, transformation subsystem 114 may be configured to transform canonicalized data structure 306 into a first network-specific data structure associated with a first decentralized network, a second network-specific data structure associated with a second decentralized network, a third network-specific data structure associated with a third decentralized network, and so on. Each of the transformations may be performed serially, or in parallel. For example, a multi-processor computing system may be configured to distribute the transformation processing to different cores such that each core processes a different transformation of the canonicalized data structure.

In some embodiments, transformation subsystem 114 may be configured to obtain a network identifier associated with the decentralized network (or networks) into which canonicalized data structure 306 is to be transformed. The network identifier may be obtained in an initial request received by server 102 to perform the transformations, stored in metadata associated with the message received by data retrieval subsystem 112, derived from the update data, or from other indicators. Based on the network identifier, transformation subsystem 114 may retrieve, access, or otherwise initialize, rules for performing one or more transformations in order to generate the network-specific data structure for the specified network.

Cryptographic subsystem 116 may be configured to encrypt the network-specific data structure. In some embodiments, cryptographic subsystem 116 may encrypt the network-specific data structure (e.g., network-specific data structure 310) using asymmetric cryptography, however other cryptography techniques may additionally or alternatively be used. Cryptographic subsystem 116 may also be configured to perform decryption, as described below. The asymmetric cryptographic process refers to a one-way encryption where the encrypted data is easy to generate (e.g., via a mathematical algorithm) but virtually impossible to decrypt without knowledge of the corresponding key for decryption.

In some embodiments, cryptographic subsystem 116 may hash the network-specific data structure to generate a hash value for the network-specific data structure. The hash value may be a bit array that is generated by taking a string of an arbitrary size and inputting the string into a function, referred to as a cryptographic hash function, or hash function. As mentioned above, the hash function may sometimes be referred to as a one-way function. A cryptographic hash function is deterministic and produces a single hash value for a given input (e.g., message) such that two different inputs cannot produce the same hash value. Some example cryptographic hash functions include, but are not limited to (which is not to imply that any other list is limiting), MD5, SHA-1, SHA-2, SHA-3, RIPEMD-160, and BLAKE3. The hash value that is generated by cryptographic subsystem 116 may be stored in local cache on server 102, and may be used for verification of the update data.

Figure 3B:
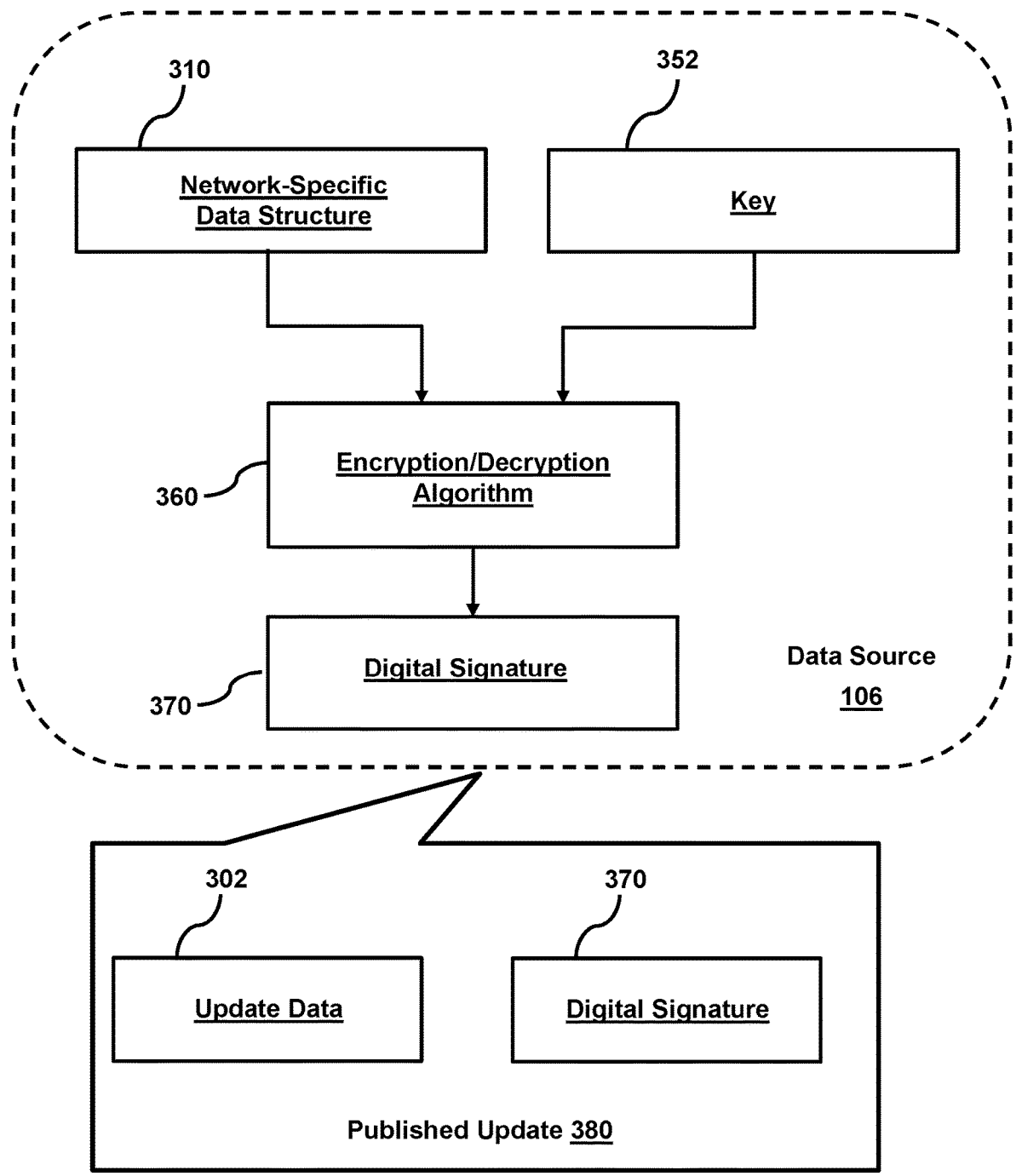

In some embodiments, server 102, data source 106, or server 102 and data source 106 together may be configured to generate a digital signature for a network-specific data structure. As an example, with reference to FIG. 3B, data source 106 may generate network-specific data structure 310 based on an update to data associated with data source 106. For example, upon a price of a stock changing (e.g., increasing or decreasing), data source 106 may generate a market update indicating the changed price of the stock. As mentioned previously, the update data (e.g., update data 302) may be used to generate network-specific data structure 310 by performing one or more transformations. In some embodiments, data source 106 may generate a canonicalized data structure (e.g., canonicalized data structure 306) based on the update data that data source 106 generated. Some embodiments may further include data source 106 generating one or more network-specific data structures (e.g., network-specific data structure 310) based on the canonicalized data structure, where each of the network-specific data structures includes parameter values for the update data represented in a corresponding, network-specific format.

In some embodiments, data source 106 may generate a digital signature based on network-specific data structure 310 and a private key of data source 106. Public/private key signing algorithms use a first key for encrypting data and a second, different key for decrypting the data. Each party of the system (e.g., a sender, a recipient) will have two keys: a public key published to all members of the system, and a private key known only to a specific party. In some embodiments, to encrypt data, such as network-specific data structure 310, a sender (e.g., data source 106) may use an intended recipient's public key (e.g., server 102, client device 104), and the recipient may use its private key to decrypt the data. In some embodiments, a sender (e.g., data source 106) may use their private key to encrypt the data, and the recipient (e.g., server 102, client device 104) will use the sender's public key to decrypt the data.

In some embodiments, data source 106 may be configured to obtain network-specific data structure 310 and key 352. Key 352 may be a private key or a public key associated with data source 106. For example, if key 352 is the private key associated with data source 106, then the corresponding public key of data source 106 will be published for use in decrypting messages (e.g., digital signatures) generated and published by data source 106.

In some embodiments, network-specific data structure 310 and key 352 may be provided to an encryption/decryption algorithm 360. Encryption/decryption algorithm 360 may be configured to generate a digital signature 370 using a cryptographic algorithm based on network-specific data structure 310 and key 352 (e.g., a private key associated with data source 106). Various types of mathematical algorithms can be used to produce, encrypt, and decrypt, and may also be used to generate public and private keys. For example, the RSA algorithm, the DSS algorithm, and elliptic curve cryptography may be used to perform encryption and decryption, and may also be used for public/private key generation. As an example, the Ethereum blockchain uses an Elliptical Curve Digital Signature Algorithm (ECDSA) for generating digital signatures, and ECDSA may also be used for key generation. To generate the keys, a random large number is generated and stored in a secure location (e.g., a digital wallet). Using the private key, a public key may be generated. In ECDSA, the public key may correspond to a location (e.g., an (x, y) point) on an elliptical curve, and the private key is used as a scalar multiplier. For instance, the location is multiplied by itself a number of times, where the number of times is equal to the scaler (i.e., the private key).

ECDSA may also be used for encryption/decryption. For example, if a first party wants to send a signed message (e.g., a digital signature) to a second party, the two parties first agree on a set of parameters. The set of parameters may include a functional representation of the elliptical curve (e.g., f(x)), a base point along the curve, B, and an order of the curve, n, where n is a prime number. The first party generates a private key, $k_{private}$, and a public key, $k_{public}$, where $$k_{public} = k_{public} \times B \qquad \text{Eq. 1.}$$

When the first party signs the message, a hash is generated by computing W(M), where M is the message to be sent, and W( ) is a cryptographic hash function. A cryptographic hash function refers to a hash function that is deterministic and produces a single hash value for a given input (e.g., message) such that two different inputs cannot produce the same hash value. Some example cryptographic hash functions include, but are not limited to (not to imply that other lists are limiting) MD5, SHA-1, SHA-2, SHA-3, RIPEMD-160, and BLAKE3. A random integer i is selected from the interval [1, n−1], and a point along the elliptical curve f(x) is determined by Eq. 2.

$$(x_1,y_1)=i \times B \qquad \text{Eq. 2.}$$

If $t=x_1 \mod(n)$ is equal to zero, a new random integer is selected and the process is repeated. After a suitable random integer is identified, a leftmost bits of the hash, where 1 is a bit length of the group order n, is determined, and Eq. 3 is computed:

$$S = \frac{1}{i}(l + tk_{public}). \qquad \text{Eq. 3}$$

The digital signature is then the pair (t, S). In response to the digital signature being obtained, the receiving party may use the signing party's public key to decode the digital signature. In some embodiments, the digital signature may be an encrypted hash value, generated by hashing data to obtain a hash value, and then encrypting the hash value with the signing party's private key. The hashing algorithm, or an indication of the hashing algorithm, used to obtain the hash value may also be included with the update data, so that the receiving party may perform a verification of the data.

After digital signature 370 is generated, data source 106 may publish update data 302 with digital signature 370 as published update 380. In some embodiments, published update 380 may refer to update data 302 with an additional data field specifying digital signature 370. For example, published update 380 may include update data 302 with an additional data field added to its data structure used to store digital signature 370. In some embodiments, published update 380 may be accessible by any entity that accesses data source 106. For instance, published update 380 may be retrieved by a party in response to submitting a request to data source 106, by a data feed periodically or dynamically output by data source 106 (e.g., an RSS feed), or by other publishing mechanisms.

In some embodiments, cryptographic subsystem 116 may further be configured to generate a reference value based on the previously obtained digital signature related to the update data, and a public key associated with the data source. As described below, a verification process will be performed to determine whether a digital signature originated from the specified data source.

In some embodiments, cryptographic subsystem 116 may be configured to generate a reference value based on the digital signature obtained with the update data and a public key associated with the data source. For instance, as indicated previously, the message including the update data may also include the digital signature related to the update data, however, alternatively, the digital signature may be included in metadata associated with the update data. In some embodiments, the update data may include an additional data field that stores the digital signature. Still further, the update data may include information indicating a particular hashing algorithm used for the generation of the digital signature. The data source may publish their public key to members of the system. In this way, cryptographic subsystem 116 may derive the reference value from the digital signature by using the public key associated with the data source to decrypt the digital signature. Some embodiments include hashing the output of the decryption (e.g., the decryption of the digital signature via the public associated with the data source) using the same hashing algorithm indicated as having been used to generate the digital signature. The hashed output of the decryption may be referred to as the reference value, which may be used with the hash value to verify the message and the data source.

In some embodiments, an additional message and an additional digital signature related to the additional message, may be obtained. The additional message may be similar to the aforementioned message. For example, the additional message may include additional update data representing an update from an additional data source. In some embodiments, data retrieval subsystem 112 may be configured to obtain the additional message and the additional digital signature. The additional message may include an additional source identifier associated with the additional data source that is indicated has having published the additional message, and may also include additional values associated with one or more additional parameters for the executable.

In some embodiments, the additional message may be transformed into an additional network-specific data structure having the network-specific format associated with the network. For instance, transformation subsystem 114 may be configured to transform the additional message, which may include the additional update data, into the additional network-specific data structure. The additional values may represented in the network-specific format. In some embodiments, the additional update data included by the additional message may be transformed to a canonicalized data structure have a canonicalized format different from the format of the update data, and may represent the parameter values of the additional update data in the canonicalized format. In some embodiments, the canonicalized data structure generated by the transformation of the additional update data may be further transformed, via transformation subsystem 114, to the additional network-specific data structure.

In some embodiments, an additional verification of the additional network-specific data structure may be performed based on the additional digital signature. For instance, verification subsystem 118 may be configured to perform the additional verification. In some embodiments, cryptographic subsystem 116 may be configured to generate a hash value of the additional network-specific data structure, and generate a reference value based on the additional digital signature and a public key associated with the additional data source. Verification subsystem 118 may determine whether the hash value of the additional network-specific data structure, and the reference value based on the additional digital signature and the public key associated with the additional data source match.

Publication subsystem 120 may be configured to provide the additional values from the network-specific data structure to the executable based on the additional verification indicating a match between the additional network-specific data structure and the additional digital signature. For example, if the hash value of the additional network-specific data structure and the reference value based on the additional digital signature, and the public key associated with the additional data source match, then a match indicator (e.g., match indicator 410) may be output, whereas, if no match is determined, then a no match indicator (e.g., no match indicator 412) may be output. In some embodiments, the executable may be configured to initiate the update to the network based on the values and the additional values. For example, the update may be initiated based on an average of the values and the additional values, an aggregation of the values and the additional values, a weighted combination of the values and the additional values, or other combinations.

In some embodiments, the messages from a data source may be obtained periodically to create candlestick pricing. For example, a message may be obtained every 5 minutes, 10 minutes, 30 minutes, etc. The parameter values indicated by the update data from each obtained message may indicate an expected value for a given parameter at a future point in time. For example, based on the price of stock at various time intervals, the future price may be predicted. In some embodiments, a quantitative model may be generated based on a plurality of verified prices. The quantitative model may be used to compute a price for a future time based on the plurality of verified prices. Some types of quantitative models that may be used include the capital asset pricing model, the Black-Scholes model, or other asset pricing models. In some embodiments, a single offline quantitative model may be replicated across multiple participants, which may each calculate results based on a given message. The results may then be used for determined settlements, trading processes, reporting, or other aspects.

In some embodiments, the update data signed with the digital signature may be used to reprice network instruments with arbitrary settlement parameters. This may allow information to be provided at any time to verify the value of an asset, which improves swapping and trading flows without inefficient or inaccurate pricing algorithms. Additionally, the update data signed with the digital signature may enable synthetic instruments to be generated, which may be real time proxies of tokens or traditional financial instruments.

Figure 4:
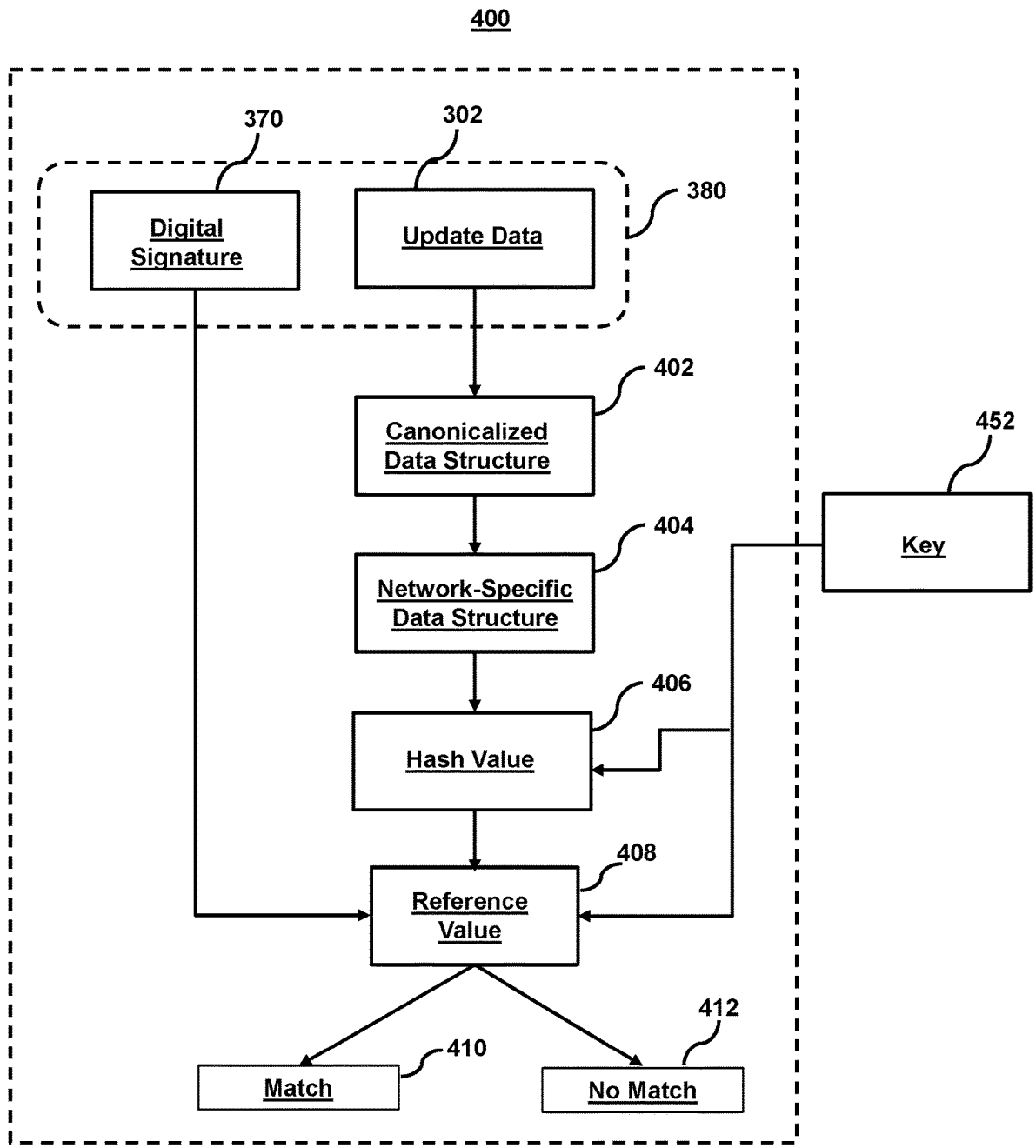
FIG. 4 shows a diagram demonstrating performance of cryptographically verification of update data, in accordance with one or more embodiments.

In some embodiments, verification subsystem 118 may be configured to perform a verification of the parameter values from the update data based on the hash value and the reference value. For example, with reference to FIG. 4, a verification process 400 may be performed to determine whether parameter values included by update data 302 of published update 380 are verifiable and able to be used as an executable on a decentralized network. In some embodiments, verification process 400 may obtain published update 380 from data source 106, from another party, or from another entity (e.g., a data feed). Verification process 400 may be used to verify that update data 302 included by published update 380 was generated by data source 106, and has not been augmented in any way by any intervening parties.

In response to receiving published update 380, update data 302 may be extracted from the published update 380. From update data 302, a canonicalized data structure having a canonicalized format may be generated. For example, as described above with respect to transformation subsystem 114, update data 302 may be transformed into canonicalized data structure 402, having the canonicalized format. Canonicalized data structure 402 may be the same or similar to canonicalized data structure 306 of FIG. 3A, and the previous description may apply. For instance, parameter values of canonicalized data structure 402 may be the same or similar to parameter values 308 of canonicalized data structure 306. The parameter values of canonicalized data structure 402 may represent parameter values of update data 302 (e.g., values associated with parameters for an executable) in the canonicalized format. In some embodiments, the executable may be stored on a network, such as a decentralized network.

In some embodiments, a network-specific data structure 404 may be generated based on canonicalized data structure 402. Network-specific data structure 404, which may be the same or similar to network-specific data structure 310, may include representations of the parameter values from update data 302 having a network-specific format. Some embodiments include the network-specific format using date types particular to the decentralized network that an executable is stored on. For example, if the executable is a smart contract stored on the Ethereum blockchain, then the parameter values may take a form specified by the Solidity programming language. This may include representing parameter values as bytes32 variables, uint256 arrays, boolean operators, or others. In some embodiments, one or more network-specific data structures, each associated with a specific network with which a corresponding smart contract may be stored, may be generated.

In some embodiments, verification subsystem 118 may generate a hash value based on the generated network-specific data structure. For example, hash value 406 may be generated by hashing network-specific data structure 404. Hash value 406 may be generated using a cryptographic hashing algorithm, as described above. The cryptographic hashing algorithm may be specified by update data 302, published update 380, or may be indicated based on the specific decentralized network for which network-specific data structure 404 was generated. In some embodiments, network-specific data structure 404 may be hashed using an encryption/decryption algorithm. The encrypted hash value may be based on hash value 406 and key 452. In some embodiments, key 452 may be a public key associated with data source 106 (e.g., the entity that is indicated as having encrypted digital signature 370).

In some embodiments, verification subsystem 118 may generate a reference value based on digital signature 370 included by published update 380 and key 452. As mentioned previously, data source 106 may generate digital signature 370 as a mechanism for an end user to verify that update data 302 was generated by data source 106, and not by (or otherwise augmented by) another entity. In some embodiments, an encryption/decryption algorithm may be used to generate a decrypted version of the reference value 408. For example, reference value 408 may be decrypted to determine whether the underlying input to the hashing algorithm was used to create digital signature 370 maps to hash value 406. In some embodiments, hash value 406 and reference value 408 may be stored in a local cache.

Verification process 400 may include comparing hash value 406 and reference value 408 to determine a similarity score. In some embodiments, the similarity score may be a binary score of TRUE (e.g., the hash value and the reference value are identical) or FALSE (e.g., the hash value and the reference value are not identical). As mentioned previously, because the hash function is a one-way function whereby no two different inputs can yield the same output, the only way for the similarity score to be TRUE is if the reference value and the hash value are the same. A similarity score of TRUE indicates that the update data received is verified as being the update data generated by the data source. A similarity score of FALSE indicates that the update data is not verified as being the update data generated by the data source. While a similarity score of FALSE does not imply that the update data, or the parameter values represented by the update data, are incorrect, it does mean that the receiver of the message including the update data cannot know for certain that the data that has been received is the most accurate data available (e.g., the data generated by the data source).

In some embodiments, if the digital signature used to generate reference value 408 is, in fact, digital signature 370 generated by data source 106, then reference value 408 should be identical to hash value 406. If the similarity score is TRUE, indicating that reference value 408 and hash value 406 are identical, verification process 400 may output a match indicator 410 to indicate that reference value 408 and hash value 406 match. Output of match indicator 410 may indicate that the parameter values represented by update data 302 in the first format may be used for the parameters of the executable. For example, upon the verification process 400 indicating that update data 302 is verified as having originated from data source 106, the parameter values represented by update data 302 may be extracted and provided to the executable to facilitate an update to the decentralized network. In some embodiments, the parameter values may serve as inputs for a smart contract on a blockchain, and based on the inputs, the smart contract may add a new block (or determine whether a new block should be added) to the blockchain. If the digital signature used to generate reference value 408 is not digital signature 370 generated by data source 106, then reference value 408 should not be identical to hash value 406. In such cases, the similarity score is FALSE, indicating that reference value 408 and hash value 406 do not match, and no match indicator 412 may be output by verification process 400. In this example, parameter values associated with the updated data included in the published update 380 that was retrieved should not be provided to the executable because the parameter values have not been verified.

Publication subsystem 120 may be configured to publish the message including the update data, which may include an additional field indicating the digital signature of the network-specific data structure. For example, published update 380 may include update data 302 with an additional data field including digital signature 370. In some embodiments, after the update data has been transformed into the network-specific data structure having parameter values of the update data represented in a network-specific format, the digital signature of the network-specific data structure may be generated. The generated digital signature of the network-specific data structure may be included within an additional data field of the message, which publication subsystem 120 may publish. By publishing the message (e.g., the message, the update included in the message, additional information related to the message, etc.), the message may be accessible to entities accessing the data source. One or more parties may access the data source (e.g., by visiting a URL or IP address associated with the data source), and may retrieve the message. The message may then be passed to one or more parties, and at any point, the message's data may be verified using the digital signature specified by the additional data field of the message, and the public key associated with the data source.

Some embodiments may also include publication subsystem 120 providing the network-specific data structure to an executable on a decentralized network. For example, the network-specific data structure, in response to a verification process indicating that update data has been verified as originating from a particular data source, may be provided to a smart contract on a decentralized network. For instance, the smart contract may be located at a specific address or addresses on the decentralized network.

In some embodiments, an executable on a decentralized network, responsive to being provided parameter values (e.g., after verification of corresponding update data), may be configured to extract the parameter values from the network-specific data structure. Some embodiments include the extracted parameter values being in the network-specific format. For example, for the Ethereum blockchain, the extracted parameter values may be network-specific parameter values 312. In some embodiments, extraction of the parameter values from the network-specific data structure may include transforming the network-specific data structure to obtain the parameter values of the update data in the first format from the parameter values of the update data in the network-specific format. This may include one or more transformation, such as transforming the network-specific data structure representing the parameter values of the update data in the network-specific format to the canonicalized data structure representing the parameter values of the update in the canonicalized format, followed by transforming the canonicalized data structure representing the parameter values of the update in the canonicalized format to the update data having the parameter values in a first format. Some embodiments may include extracting the parameter values in the first format from the update data. For example, the update data may be provided to the executable. For instance, the update data may be retrieved from the data source and provided to the executable, or may be sent as an additional, or associated, message from the sending party of the update data. Some embodiments may further include the parameter update values represented in the first format obtained from the verified digital signature. For example, using the public key associated with the data source, the digital signature of the message may be decrypted to generate the update data.

In some embodiments, the executable may be used to verify the digital signature over the canonical form if the executable has the public key of the corresponding data source explicitly, or if the public key is defined in the executable. Alternatively, the public key may be derived from the digital signature provided to the executable, or if the public key used to sign the update data is provided as part of the executable call.

In some embodiments, the executable may be generated specifically for performing the verification process. The executable (e.g., a smart contract) may then be stored on the decentralized network. In some embodiments, other executables may use the executable as a service to verify messages, such that the other executables do not need to perform the transformations (e.g., transformation to canonicalized data structures, transformation to network-specific data structures), or verifications.

In some embodiments, ledger update subsystem 122 may be configured to initiate an update to the decentralized network based on the extracted parameter values. In some embodiments, the executable may be configured to initiate the update based on one or more conditions associated with the executable being met. For example, the condition may include determining whether the hash value generated based on the network-specific data structure, and the reference value generated based on the digital signature and the public key associated with the data source, match. If the hash value and the reference value match, then the conditions may be satisfied. If the hash value and the reference value do not match, then the conditions may not be satisfied.

Ledger update subsystem 122 may store a blockchain. As an example, the blockchain may include one or more blocks. Each of the blocks may include one or more blockchain transactions. Each of the blockchain transaction may involve a primary token of the blockchain (e.g., Ether is the primary token of the Ethereum blockchain). As another example, each of the blocks may be linked to an immediately prior block in the blockchain. Each of the blocks may be secured using cryptography. In one use case, each block may contains a hash pointer as a link to an immediately prior block, a timestamp, and transaction information (related to one or more transactions), or other information. As another example, the blockchain may be obtained from one or more sources. The blockchain may be updated by obtaining one or more portions of the blockchain stored at one or more sources (e.g., by syncing the stored blockchain with the portions obtained from multiple sources, by verifying that the portions obtained from one source match corresponding portions obtained from one or more other sources, etc.). Additional details regarding blockchains and tokens (e.g., primary tokens, secondary tokens, etc.) for blockchain transactions are described in U.S. Pat. No. 10,581,591, entitled "Probabilistic secondary token issuance on a blockchain based on burning of a primary token of the blockchain," which issued Mar. 3, 2020 having common inventorship, and the disclosure of which is hereby incorporated by reference in its entirety.

In some embodiments, each blockchain transaction may be associated with the update. The blockchain transaction may indicate an amount of funds dispersed or to be dispersed from a first party to a second party based on the rules of a smart contract and the verified update data. As an example, a smart contract on the blockchain may be configured to initiate an update based on parameter values of a market update. The update may be to award a predetermined amount of funds to a first party (from a second party) based on whether the first party correctly predicted a binary option. For instance, the binary option may be award a certain amount of funds to a first party if the first party correctly determined whether the value of the stock is above or below a predicted strike price expiring at a predetermined time. If the first party correctly predicted the value, then the smart contract may initiate the update on the blockchain, causing a block to be added to the blockchain including a blockchain transaction reflecting the predetermined amount of funds being provided to the first party (from the second party). If the first party did not correctly predict the value, then the smart contract may initiate an update on the blockchain, causing a block to be added to the blockchain including a blockchain transaction reflecting the predetermined amount of funds being retrieved from the first party (and provided to the second party). In order for the smart contract to execute, the parameter values, which, for example, indicate the price of a stock at a given time, are obtained and verified as having originated from a trusted data source, such as a financial exchange that generated the market update, or other data source.

In some embodiments, upon confirmation of the price execution, a token may be generated. For example, after confirming one or more prices based on the update data and the digital signature, cryptocurrency may be generated in accordance with the terms of the executable. One or more tokens, having a value associated with the amount to be awarded from the executable, may be generated and awarded to a winning party. As an example, if Party A accurately predicts a price of an option at expiry, then a smart contract may generate a token or tokens stipulated by the smart contract, and award the token(s) to Party A.

In some embodiments, the update data may include a plurality of prices or price updates. The update data including the plurality of prices may then be used to generate a digital signature for the update data. For example, the update data including the plurality of prices may be used to generate a canonicalized data structure, the canonicalized data structure may be used to generate a network-specific data structure, and the network-specific data structure may be used to generate a digital signature for the update data. In some embodiments, another executable may be configured to request a price for one or more of the plurality of stocks included by the updated data. For example, an application may submit an application programming interface (API) call to retrieve a price for a given stock. The API call may specify a given stock (e.g., via an instrument ID associated with the stock) and a quantity for the price. Server 102 and/or data source 106 may then provide the verified stock price to the application as a response to the API call.

Examples Flowcharts

Figure 5:
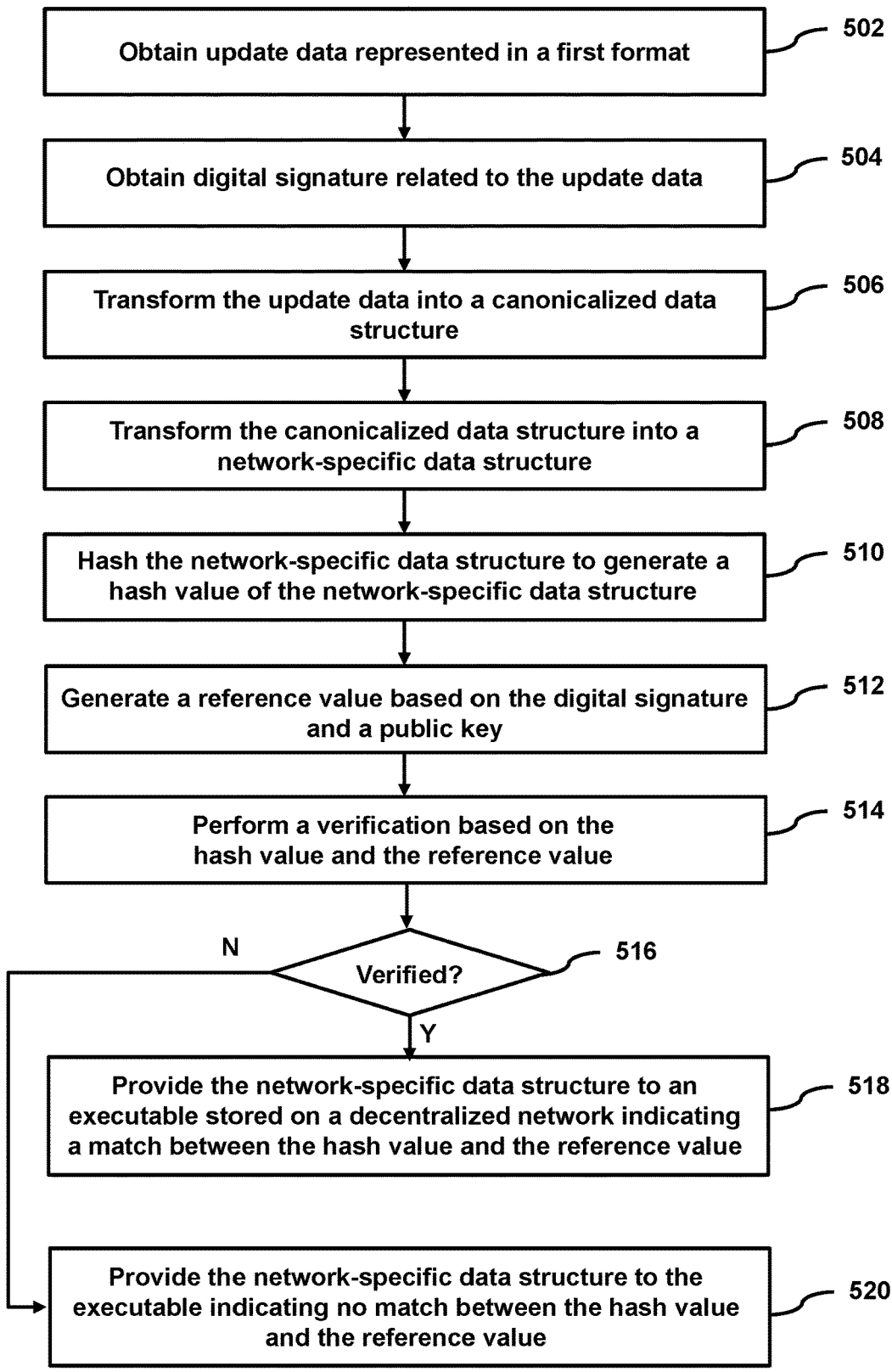
FIG. 5 shows a flowchart of a process for facilitating cryptographic verification of update data, in accordance with one or more embodiments.
Figure 6:
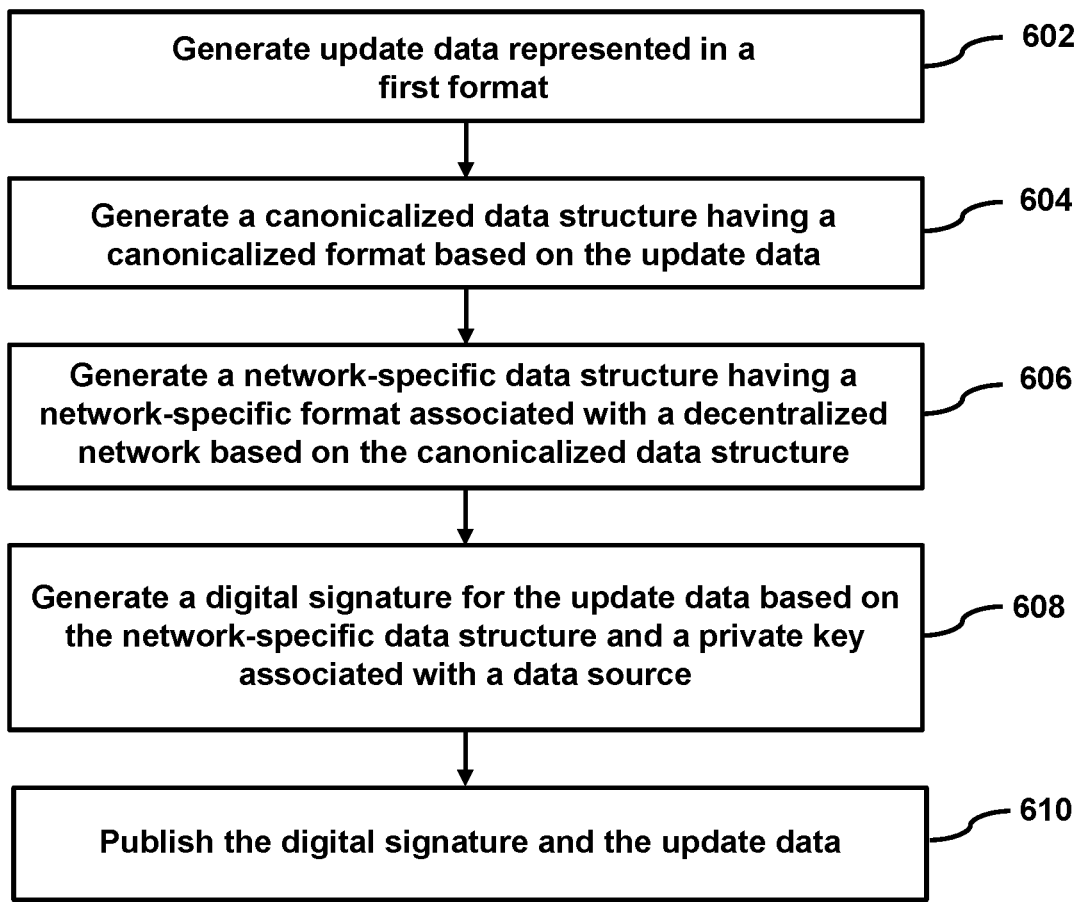
FIG. 6 shows a flowchart of a process of a data source publishing cryptographically verifiable update data, in accordance with one or more embodiments.

FIGS. 5 and 6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart of a process 500 for facilitating cryptographic verification of update data, in accordance with one or more embodiments. In an operation 502, update data represented in a first format may be obtained. In some embodiments, the update data may be included in a message, which may be obtained by server 102, client device 104, both server 102 and client device 104, and/or other devices. The update data may include a source identifier associated with a data source designated with respect to an executable. In some embodiments, the executable may be stored on a decentralized network. For example, the update data may include an identifier associated with data source 106, and may be used by a smart contract stored on a blockchain to initiate updates. The update data may further include parameter values associated with one or more parameters for the executable. In some embodiments, the parameters may include a primary instrument, a secondary instrument, a price, a quantity, a side, a timestamp or sequence number, or other parameters. For example, the parameter "price" may refer to the price of a company's stock in a particular currency. Operation 502 may be performed by data retrieval subsystem 112, in accordance with one or more embodiments.

In an operation 504, a digital signature related to the update data may be obtained. The digital signature may be generated by data source 106, as detailed below with respect to FIG. 6. In some embodiments, the digital signature may be obtained with the update data. For example, digital signature 370 may be obtained with update data 302 by server 102 and/or client device 104 in order to perform a verification of update data 302. Operation 504 may be performed by data retrieval subsystem 112, in accordance with one or more embodiments.

In an operation 506, the update data may be transformed into a canonicalized data structure. The canonicalized data structure may have a canonicalized format that differs from the first format of the update data. For instance, the canonicalized data structure may represent the parameter values of the update data in the canonicalized format. As an example, update data 302 including parameter values 304 may be transformed into canonicalized data structure 306 having parameter values 308 represented in a canonicalized format. Operation 506 may be performed by transformation subsystem 114, in accordance with one or more embodiments.

In an operation 508, the canonicalized data structure may be transformed into a network-specific data structure. The network-specific data structure may have a network-specific format associated with the decentralized network that the executable, with which the parameter values are to be used for in order to initiate an update (and possibly perform one or more transactions), is stored on. The network-specific format may differ from the canonicalized format of the canonicalized data structure, and from the first format of the update data. For instance, the network-specific data structure may represent the parameter values of the update data in the network-specific format. As an example, canonicalized data structure 306, having parameter values 308 represented in a canonicalized format, may be transformed into network-specific data structure 310, having network-specific parameter values 312 represented in the network-specific format. In some embodiments, multiple network-specific data structures may be generated for each of a plurality of networks having an executable stored thereon with which the parameter values are to be used for initiating an update. Operation 508 may be performed by transformation subsystem 114, in accordance with one or more embodiments.

In an operation 510, the network-specific data structure may be hashed to generate a hash value of the network-specific data structure. In some embodiments, a cryptographic hashing algorithm may be used to generate the hash value. The hashing algorithm may include a hashing function that outputs a unique hash value for a given input such that no two inputs produce the same hash value. In some embodiments, an indication of a specific hashing algorithm to be used may be indicated by the update data. In some embodiments, the hash value may be encrypted using an encryption/decryption algorithm to obtain an encrypted hash value. Operation 510 may be performed by cryptographic subsystem 116, in accordance with one or more embodiments.

In an operation 512, a reference value may be generated based on the digital signature and a public key. The digital signature may be generated by data source 106 based on network-specific data structure 310 and a private key (e.g., key 352) associated with data source. In some embodiments, the public key may also be associated with data source 106, and may be used to decrypt the digital signature and obtain the reference value. In some embodiments, the reference value may represent a hash value of the network-specific data structure generated by data source 106 responsive to generating the update data. Operation 512 may be performed by cryptographic subsystem 116, in accordance with one or more embodiments.

In an operation 514, a verification may be performed based on the hash value and the reference value. The verification may be used to determine whether the hash value and the reference value match. In some embodiments, the verification may include generating a similarity score based on the hash value and the reference value, and determining whether the similarity score is greater than a threshold score. The verification may generate an output indicating whether the hash value matches the reference value. Some embodiments include a verification causing match indicator 410 to be output if the reference value and the hash value are determined to match (i.e., be identical), or cause no match indicator 412 to be output if the reference value and the hash value are determined to not match (i.e., not be identical). Operation 514 may be performed by verification subsystem 118, in accordance with one or more embodiments.

In an operation 516, a determination may be made as to whether the verification indicated a match or no match. For instance, the verification may determine whether the update data was generated by data source 106. If the hash value and the reference value are determined to match, then the update data, and thus the parameter values represented by the update data, is verified as having been generated by the indicated data source. If the hash value and the reference value are determined to not match, then the update data, and thus the parameter values represented by the update data, are unable to be verified as having been generated by the indicated data source. Operation 516 may be performed by verification subsystem 118, in accordance with one or more embodiments.

If, at operation 516, it is determined that the update data has been verified, then process 500 may proceed to operation 518. If, at operation 516, it is determined that the update data has not been verified, then process 500 may proceed to operation 520.

In operation 518, the network-specific data structure may be provided to an executable indicating a match between the hash value and the reference value. In some embodiments, the executable may be stored on a decentralized network. For example, network-specific data structure 404 may be provided to a smart contract stored on a blockchain. In some embodiments, the executable may be configured to extract the parameter values from the network-specific data structure. Based on the extracted parameter values, the executable may be configured to initiate an update to the decentralized network. For example, based on the extracted parameter values, the smart contract may cause a block to be added to the blockchain including one or more transactions determined based on the parameter values. Operation 518 may be performed by publication subsystem 120, ledger update subsystem 122, or both publication subsystem 120 and ledger update subsystem 122, in accordance with one or more embodiments.

In operation 520, the network-specific data structure may be provided to an executable indicating no match between the hash value and the reference value. For example, network-specific data structure 404 may be provided to a smart contract stored on a blockchain. In some embodiments, the executable may be configured to extract the parameter values from the network-specific data structure, or not extract the parameter values. Based on the extracted parameter values, or based on no parameter values being extracted, the executable may be configured to initiate an update to the decentralized network. For example, the smart contract may cause a block to be added to the blockchain indicating that no transactions were performed, or may not cause a block to be added to the blockchain. Operation 520 may be performed by publication subsystem 120, ledger update subsystem 122, or both publication subsystem 120 and ledger update subsystem 122, in accordance with one or more embodiments.

FIG. 6 shows a flowchart of a process 600 of a data source publishing cryptographically verifiable update data, in accordance with one or more embodiments. In an operation 602, update data represented in a first format may be generated. In some embodiments, data source 106 may generate update data including values for one or more parameters that have been updated. For example, the update data may indicate a change in a price of a company's stock, where the price in a particular currency corresponds to a parameter. Operation 602 may be performed by data retrieval subsystem 112, which may be executed by server 102, data source 106, or both server 102 and data source 106, in accordance with one or more embodiments.

In an operation 604, a canonicalized data structure having a canonicalized format may be generated based on the update data. For example, as described above with respect to operation 506 of process 500, the update data may be transformed to the canonicalized data structure. The canonicalized data structure may represent the parameter values of the update data in a canonicalized format different from a first format of the update data. For example, canonicalized data structure 306, representing parameter values 308 in the canonicalized format, may be generated based on update data 302, including parameter values 304 represented in a first format. Operation 604 may be performed by transformation subsystem 114, which may be executed by server 102, data source 106, or both server 102 and data source 106, in accordance with one or more embodiments.

In an operation 606, a network-specific data structure having a network-specific format associated with a decentralized network may be generated based on the canonicalized data structure. For example, as described above with respect to operation 508 of process 500, the canonicalized data structure may be transformed to the network-specific data structure. The network-specific data structure may represent the parameter values of the update data in a network-specific format different from the first format of the update data and the canonicalized format of the canonicalized data structure. For example, network-specific data structure 310, representing network-specific parameter values 312 in the network-specific format, may be generated based on canonicalized data structure 306, representing parameter values 308 in the canonicalized format. Operation 606 may be performed by transformation subsystem 114, which may be executed by server 102, data source 106, or both server 102 and data source 106, in accordance with one or more embodiments.

In an operation 608, a digital signature for the update data may be generated based on the network-specific data structure and a private key associated with a data source. For example, a private key associated with data source may be used to generate digital signature 370. In some embodiments, the digital signature may be generated using an encryption/decryption algorithm. Furthermore, in some embodiments, the digital signature may be encrypted to obtain an encrypted hash value. The encrypted hash value may reduce the size of the digital signature, as the output of the hash function is a hash value, while the output of the digital signature has a size equal to the network-specific data structure (e.g., the message to be encrypted). Operation 608 may be performed by cryptographic subsystem 116, which may be executed by server 102, data source 106, or both server 102 and data source 106, in accordance with one or more embodiments.

In an operation 610, the digital signature and the update data may be published. For example, published update 380 may be published by data source 106 for public access. The digital signature, as detailed above, may be used to verify the update data received by a party as having been generated by data source 106. Operation 610 may be performed by publication subsystem 120, which may be executed by server 102, data source 106, or both server 102 and data source 106, in accordance with one or more embodiments.

In some embodiments, the various computers and subsystems illustrated in FIG. 1 may include one or more computing devices that are programmed to perform the functions described herein. The computing devices may include one or more electronic storages (e.g., market update database(s) 130, ledger database(s) 140, or other electric storages), one or more physical processors programmed with one or more computer program instructions, and/or other components. The computing devices may include communication lines or ports to enable the exchange of information with a network (e.g., network 150), or with other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may implement a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities to the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-122, or other subsystems. The processors may be programmed to execute computer program instructions by software; hardware; firmware; some combination of software, hardware, or firmware, and/or other mechanisms for configuring processing capabilities on the processors.

It should be appreciated that the description of the functionality provided by the different subsystems 112-122 described herein is for illustrative purposes, and is not intended to be limiting, as any of subsystems 112-122 may provide more or less functionality than is described. For example, one or more of subsystems 112-122 may be eliminated, and some or all of its functionality may be provided by other ones of subsystems 112-122. As another example, additional subsystems may be programmed to perform some or all of the functionality attributed herein to one of subsystems 112-122.

Although the present application has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

A1. A method comprising: obtaining a message and a digital signature related to the message, the message comprising (i) a source identifier associated with a data source, and (ii) values associated with one or more parameters for an executable; transforming the message into a network-specific data structure having a network-specific format associated with a network, the network-specific format representing the values of the message in the network-specific format; performing a verification of the network-specific data structure based on the digital signature; and providing the values to the executable based on the verification indicating a match between the network-specific data structure and the digital signature, wherein the executable initiates an update to the network based on the values.

A2. The method of embodiment A1, wherein the executable is stored on the network.

A3. The method of any one of embodiments A1-A2, wherein the message comprises first data represented in a first format, the method further comprises: generating a first data structure having a second format differing from the first format, the first data structure representing the values associated with the one or more parameters in the second format, wherein: transforming the message into the network-specific data structure comprises generating the first data structure based on the message comprising the first data; and generating the network specific data structure based on the first data structure.

A4. The method of any one of embodiments A1-A3, wherein generating the first data structure comprises transforming the first data represented in the first format into the first data structure having the second format; and generating the network-specific data structure comprises transforming the first data structure into the network-specific data structure.

A5. The method of any one of embodiments A1-A4, wherein the first data structure comprises a canonicalized data structure, and the second format comprises a canonicalized format.

A6. The method of any one of embodiments A1-A5, further comprising: obtaining a public key associated with the data source; and generating a reference value based on the digital signature and the public key associated with the data source, wherein the verification of the network-specific data structure is based on the reference value.

A7. The method of embodiment A6, wherein performing the verification of the network-specific data structure comprises: generating a hash value of the network-specific data structure; and determining that the hash value and the reference value match, wherein the values are provided to the executable based on the verification indicating that the hash value and the reference value match.

A8. The method of any one of embodiments A6-A7, further comprising: generating an encrypted hash value by encrypting the hash value, and wherein the verification is performed based on the encrypted hash value and the reference value.

A9. The method of any one of embodiments A1-A8, further comprising: causing the values to be extracted from the network-specific data structure based on the executable for initiating the update to the network.

A10. The method of any one of embodiments A1-A9, wherein prior to the message being obtained, the digital signature is generated based on the message.

A11. The method of embodiment A10, wherein the digital signature is generated by the data source.

A12. The method of embodiment A11, wherein the data source generates the digital signature by: generating the first data in the first format; generating an instance of the canonicalized data structure having the canonicalized format based on the first data; generating an instance of the network-specific data structure having the network-specific format associated with the decentralized network based on the instance of the canonicalized data structure; generating the digital signature for the first data based on the network-specific data structure and a private key corresponding to the public key; and providing the digital signature and the first data such that the digital signature and the first data are available for public access.

A13. The method of embodiment A12, wherein the first data comprises update data.

A14. The method of embodiment A13, wherein the update data comprises data representing a market update indicating an update to a financial market.

A15. The method of any one of embodiments A1-A14, wherein the data source comprises a financial exchange.

A16. The method of any one of embodiments A1-A15, wherein the message comprises update data represented in the first format, obtaining the message and the digital signature related to the message comprises obtaining update data represented in the first format and the digital signature, the digital signature being related to the update data, wherein the update data comprises (i) the source identifier associated with the data source designated with respect to the executable, and (ii) the parameter values associated with the one or more parameters for the executable stored on the decentralized network.

A17. The method of embodiment A16, wherein the executable (i) extracts the parameter values from the network-specific data structure to obtain extracted parameter values, and (ii) initiates the update to the decentralized network based on the extracted parameter values.

A18. The method of any one of embodiments A1-A17, wherein the message comprises the update data, and the update data comprises an additional data field specifying the digital signature.

A19. The method of claim A18, wherein the message further includes an indication of a hashing algorithm used to generate the hash value.

A20. The method of any one of embodiments A1-A19, further comprising: transforming the message into one or more additional network-specific data structures each having a corresponding network-specific format associated with a corresponding additional network, the corresponding network-specific format representing the values of the message in the corresponding network-specific format, wherein an additional verification is performed for each of the one or more additional network-specific data structures based on an additional hash value generated for each of the one or more additional network-specific data structures.

A21. The method of embodiment A20, wherein the one or more network-specific data structures are transformed in parallel via a computing device including a multi-core processor such that each core of the multi-core processor is configured to transform the message into one of the one or more network-specific data structures.

A22. The method of any one of embodiments A1-A21, further comprising: obtaining an additional message and an additional digital signature related to the additional message, the additional message comprising (i) an additional source identifier associated with an additional data source, and (ii) additional values associated with one or more additional parameters for the executable; transforming the additional message into an additional network-specific data structure having the network-specific format associated with the network, wherein the additional values are represented in the network-specific format; performing an additional verification of the additional network-specific data structure based on the additional digital signature; and providing the additional values to the executable based on the additional verification indicating an additional match between the additional network-specific data structure and the additional digital signature, wherein the executable initiates the update to the network based on the values and the additional values.

A23. The method of embodiment A22, wherein the executable is configured to initiate the update to the network based on at least one of an average of the values and the additional values, an aggregation of the values and the additional values, or a weighted combination of the values and the additional values.

A24. The method of any one of embodiments A1-A23, wherein the network comprises a decentralized network.

A25. The method of any one of embodiments A1-A24, wherein the method is performed by a server, a client device, or both a server and a client device.

A26. The method of any one of embodiments A1-A25, wherein performing the verification of the network-specific data structure based on the digital signature comprises: hashing the network-specific data structure to obtain a hash value; generating a reference value based on the digital signature and a public key associated with the data source; and generating a similarity score based on the hash value and the reference value.

A27. The method of embodiment A26, wherein the match is determined based on the similarity score exceeding a threshold score.

A28. The method of embodiment A27, wherein: the similarity score exceeding the threshold score causes a match indicator to be output indicating a match between the hash value and the reference value, and the similarity score not exceeding the threshold score causes a no match indicator to be output indicating no match between the hash value and the reference value.

A29. The method of any one of embodiments A1-A28, wherein the method is performed by one or more servers, one or more client devices, or one or more servers and one or more client devices.

A30. The method of any one of embodiments A1-A29, wherein the executable is stored on a blockchain.

A31. The method of embodiment A30, wherein the executable is a smart contract.

B1. A method, comprising: generating update data in a first format; generating a canonicalized data structure having a canonicalized format based on the update data; generating a network-specific data structure having a network-specific format associated with a network that an executable is stored on; generating a digital signature for the update data based on the network-specific data structure and a private key; and providing the digital signature and the update data such that the digital signature and the update data are available for public access.

B2. The method of embodiment B1, wherein the update data comprises an additional data field specifying the digital signature.

B3. The method of any one of embodiments B1-B2, wherein a data source is configured to perform the method.

B4. The method of embodiment B3, wherein the update data comprises a source identifier of the data source.

B5. The method of any one of embodiments B1-B4, wherein the update data comprises parameter values associated with one or more parameters for the executable stored on the network.

B6. The method of any one of embodiments B1-B5, wherein the network comprises a decentralized network.

B7. The method of any one of embodiments B1-B6, wherein generating the canonicalized data structure having the canonicalized format based on the update data comprises: transforming the update data into the canonicalized data structure having the canonicalized format, wherein the canonicalized format differs from the first format of the update data, and wherein the canonicalized data structure represents the parameter values of the update data in the canonicalized format.

B8. The method of any one of embodiments B1-B7, wherein generating the network-specific data structure having the network-specific format associated with the network that the executable is stored on comprises: transforming the canonicalized data structure into the network-specific data structure having the network-specific format, wherein the network-specific format is different than the canonicalized format and the first format, and wherein the network-specific data structure represents the parameter values of the update data in the network-specific format.

B9. The method of any one of embodiments B1-B9, wherein generating the digital signature for the update data based on the network-specific data structure and the private key comprises: generating, using a public/private key generation algorithm, the private key and a public key; and encrypting the network-specific data structure with the private key.

B10. The method of embodiment B9, wherein encrypting the network-specific data structure comprises: hashing the network-specific data structure to obtain a hash value; and encrypting the hash value with the private key to obtain an encrypted hash value.

C1. A tangible, non-transitory, machine-readable medium storing instructions that when executed by a data processing apparatus cause the data processing apparatus to perform operations comprising those of any of embodiments A1-A31 or B1-B10.

D1. A system, comprising: one or more processors; and memory storing instructions that when executed by the processors cause the processors to effectuate operations comprising those of any of embodiments A1-A31 or B1-B10.

What is claimed is:

1. A system, comprising:
memory storing computer program instructions; and
one or more processors that, when executing the computer program instructions, effectuate operations comprising:
obtaining update data represented in a first format and a digital signature related to the update data, wherein the update data comprises (i) a source identifier associated with a data source designated with respect to an executable stored on a decentralized network, and (ii) parameter values associated with one or more parameters for the executable stored on the decentralized network;
transforming the update data into a canonicalized data structure having a canonicalized format different from the first format, the canonicalized data structure representing the parameter values of the update data in the canonicalized format;
transforming the canonicalized data structure into a network-specific data structure having a network-specific format associated with the decentralized network, the network-specific format being different from the canonicalized format and the first format, the network-specific data structure representing the parameter values of the update data in the network-specific format;
hashing the network-specific data structure to generate a hash value of the network-specific data structure;
generating a reference value based on the digital signature and a public key associated with the data source;
performing a verification of the parameter values based on the hash value and the reference value; and
providing the network-specific data structure to the executable based on the verification indicating a match between the hash value and the reference value, wherein the executable (i) extracts the parameter values from the network-specific data structure to obtain extracted parameter values, and (ii) initiates an update to the decentralized network based on the extracted parameter values.

2. The system of claim 1, wherein the data source is configured to generate the digital signature prior to the update data being obtained, the data source being configured to:
generate the update data in the first format;
generate an instance of the canonicalized data structure having the canonicalized format based on the update data;
generate an instance of the network-specific data structure having the network-specific format associated with the decentralized network based on the instance of the canonicalized data structure;
generate the digital signature for the update data based on the network-specific data structure and a private key corresponding to the public key; and
provide the digital signature and the update data such that the digital signature and the update data are available for public access.

3. The system of claim 1, wherein the operations further comprise:
transforming the canonicalized data structure into a plurality of network-specific data structures, wherein each of the plurality of network-specific data structures has a corresponding network-specific format associated with each of a plurality of decentralized networks.

4. The system of claim 1, wherein transforming the canonicalized data structure into the network-specific data structure comprises:
determining a network identifier indicating the decentralized network for which the canonicalized data structure is to be transformed; and
transforming the canonicalized format of each of the parameter values from the update data into a corresponding network-specific format based on the network identifier of the decentralized network.

5. A non-transitory computer-readable medium storing computer program instructions that, when executed by one or more processors, effectuate operations comprising:
obtaining a message and a digital signature related to the message, the message comprising (i) a source identifier associated with a data source, and (ii) values associated with one or more parameters for an executable;
transforming the message into a network-specific data structure having a network-specific format associated with the network, the network-specific format representing the values of the message in the network-specific format;
performing a verification of the network-specific data structure based on the digital signature; and
providing the values to the executable based on the verification indicating a match between the network-specific data structure and the digital signature, wherein the executable initiates an update to the network based on the values.

6. The non-transitory computer-readable medium of claim 5, wherein the message comprises first data represented in a first format, the operations further comprise:
transforming the first data represented in the first format into a first data structure having a second format differing from the first format, the first data structure representing the values associated with the one or more parameters in the second format, wherein:
transforming the message into the network-specific data structure comprises transforming the first data structure into the network specific data structure.

7. The non-transitory computer-readable medium of claim 5, wherein the operations further comprise:
obtaining a public key associated with the data source; and
generating a reference value based on the digital signature and the public key associated with the data source, wherein the verification of the network-specific data structure is based on the reference value.

8. The non-transitory computer-readable medium of claim 7, wherein performing the verification of the network-specific data structure comprises:
generating a hash value of the network-specific data structure; and
determining that the hash value and the reference value match, wherein the values are provided to the executable based on the verification indicating that the hash value and the reference value match.

9. The non-transitory computer-readable medium of claim 5, wherein the operations further comprise:
causing the values to be extracted from the network-specific data structure based on the executable for initiating the update to the network.

10. The non-transitory computer-readable medium of claim 5, wherein, prior to message being obtained, the digital signature is generated based on the message.

11. The non-transitory computer-readable medium of claim 5, wherein the operations further comprise:
obtaining an additional message and an additional digital signature related to the additional message, the additional message comprising (i) an additional source identifier associated with an additional data source, and (ii) additional values associated with one or more additional parameters for the executable;
transforming the additional message into an additional network-specific data structure having the network-specific format associated with the network, wherein the additional values are represented in the network-specific format;
performing an additional verification of the additional network-specific data structure based on the additional digital signature; and
providing the additional values to the executable based on the additional verification indicating an additional match between the additional network-specific data structure and the additional digital signature, wherein the executable initiates the update to the network based on the values and the additional values.

12. The non-transitory computer-readable medium of claim 11, wherein the executable is configured to initiate the update to the network based on at least one of an average of the values and the additional values, an aggregation of the values and the additional values, or a weighted combination of the values and the additional values.

13. The non-transitory computer-readable medium of claim 5, wherein the executable is configured to initiate the update by determining, based on the values, whether a condition associated with the executable has been satisfied.

14. A method implemented by one or more processors executing one or more computer program instructions that, when executed, perform the method, the method comprising:
obtaining a message and a digital signature related to the message, the message comprising (i) a source identifier associated with a data source, and (ii) values associated with one or more parameters for an executable;
transforming the message into a network-specific data structure having a network-specific format associated with a network, the network-specific format representing the values of the message in the network-specific format;
performing a verification of the network-specific data structure based on the digital signature; and
providing the values to the executable based on the verification indicating a match between the network-specific data structure and the digital signature, wherein the executable initiates an update to the network based on the values.

15. The method of claim 14, wherein the message comprises first data represented in a first format, the method further comprising:
transforming the first data represented in the first format into a first data structure having a second format differing from the first format, wherein the first data structure represents the values associated with the one or more parameters in the second format, wherein:
transforming the message into the network-specific data structure comprises transforming the first data structure into the network-specific data structure.

16. The method of claim 14, further comprising:
obtaining a public key associated with the data source; and
generating a reference value based on the digital signature and the public key associated with the data source, wherein the verification of the network-specific data structure is based on the reference value.

17. The method of claim 16, wherein performing the verification of the network-specific data structure comprises:
generating a hash value of the network-specific data structure; and
determining that the hash value and the reference value match, wherein the values are provided to the executable based on the verification indicating that the hash value and the reference value match.

18. The method of claim 14, further comprising:
causing the values to be extracted from the network-specific data structure based on the executable for initiating the update to the network.

19. The method of claim 14, further comprising:
obtaining an additional message and an additional digital signature related to the additional message, the additional message comprising (i) an additional source identifier associated with an additional data source, and (ii) additional values associated with one or more additional parameters for the executable;
transforming the additional message into an additional network-specific data structure having the network-specific format associated with the network, wherein the additional values are represented in the network-specific format;
performing an additional verification of the additional network-specific data structure based on the additional digital signature; and
providing the additional values to the executable based on the additional verification indicating an additional match between the additional network-specific data structure and the additional digital signature, wherein the executable initiates the update to the network based on the values and the additional values.

20. The method of claim 19, wherein the executable is configured to initiate the update to the network based on at least one of an average of the values and the additional values, an aggregation of the values and the additional values, or a weighted combination of the values and the additional values.

* * * * *